(12) United States Patent
Erler et al.

(10) Patent No.: US 9,067,465 B2
(45) Date of Patent: Jun. 30, 2015

(54) TUBELESS RIM SEAL FOR A LACED WHEEL

(75) Inventors: Randal Erler, Hartford, WI (US); Anthony Wilcox, Sussex, WI (US); Christopher Ojstrsek, Slinger, WI (US); Eric P. Alander, New Philadelphia, OH (US)

(73) Assignees: Harley-Davidson Motor Company Group, LLC, Milwaukee, WI (US); Lauren Maufacturing Company, New Philadelphia, OH (US)

( * ) Notice: Subject to any disclaimer, the term of this patent is extended or adjusted under 35 U.S.C. 154(b) by 845 days.

(21) Appl. No.: 12/712,467

(22) Filed: Feb. 25, 2010

(65) Prior Publication Data

US 2011/0204706 A1 Aug. 25, 2011

(51) Int. Cl.
| | |
|---|---|
| *B60C 15/02* | (2006.01) |
| *B60C 5/16* | (2006.01) |
| *B60B 1/00* | (2006.01) |
| *B60B 21/04* | (2006.01) |
| *B60B 21/10* | (2006.01) |
| *B60B 21/12* | (2006.01) |
| *B60C 29/04* | (2006.01) |

(52) U.S. Cl.
CPC ... *B60C 5/16* (2013.01); *B60B 1/00* (2013.01); *B60B 21/04* (2013.01); *B60B 21/108* (2013.01); *B60B 21/12* (2013.01); *B60C 15/0209* (2013.01); *B60C 29/04* (2013.01)

(58) Field of Classification Search
CPC .... B60B 21/12; B60C 15/02; B60C 15/0226; B60C 15/0213; B60C 5/16
USPC .......... 152/379.4, 381.3–381.6; 264/35, 46.4, 264/277, 279
See application file for complete search history.

(56) References Cited

U.S. PATENT DOCUMENTS

| | | | | |
|---|---|---|---|---|
| 2,773,535 | A | * 12/1956 | Tolonen | ........................ 152/501 |
| 3,638,707 | A | 2/1972 | Le Gall | |
| 3,866,653 | A | * 2/1975 | Lejeune | ........................ 152/501 |
| 3,965,957 | A | * 6/1976 | Nakasaki | ....................... 152/400 |
| 4,043,373 | A | 8/1977 | Durham | |

(Continued)

FOREIGN PATENT DOCUMENTS

| | | |
|---|---|---|
| DE | 20007634 U1 | 8/2000 |
| DE | 20108416 U1 | 9/2001 |

(Continued)

OTHER PUBLICATIONS

Office Action for Japanese Application No. JP2011-038659 dated Dec. 16, 2014 (6 pages)

*Primary Examiner* — Jason Bellinger
(74) *Attorney, Agent, or Firm* — Michael Best & Friedrich LLP

(57) ABSTRACT

A rim seal and method of manufacturing are provided. A rim seal segment is provided having two free ends and being constructed of a sealing material having a contoured cross-sectional profile. The rim seal segment has a length shorter than a circumference of the rim seal. The two free ends are inserted into a mold in spaced relationship with each other, and a connector is molded between the two free ends to connect the free ends and transform the rim seal segment into a continuous circumferential rim seal. A valve stem may be molded into the connector. A tire-facing surface defined by the combination of the rim portion and an outer surface of the rim seal has a profile conforming to an industry standard.

19 Claims, 9 Drawing Sheets

(56) References Cited

U.S. PATENT DOCUMENTS

| | | | |
|---|---|---|---|
| 4,453,581 A * | 6/1984 | Easterly | 152/511 |
| 4,824,177 A | 4/1989 | Aloy | |
| 5,232,032 A | 8/1993 | Diernaz | |
| 5,302,229 A | 4/1994 | Lai | |
| 5,355,923 A | 10/1994 | Boni et al. | |
| 5,538,058 A * | 7/1996 | Aloy | 152/381.5 |
| 6,019,149 A | 2/2000 | Stringer | |
| 6,155,651 A | 12/2000 | Mizata et al. | |
| 6,365,086 B1 * | 4/2002 | Schoonover et al. | 264/277 |
| 6,423,395 B1 | 7/2002 | Luo | |
| 6,679,306 B2 | 1/2004 | Steinke | |
| 6,782,931 B2 * | 8/2004 | Koziatek | 152/502 |
| 7,055,569 B2 | 6/2006 | Koziatek | |
| 7,104,300 B2 | 9/2006 | Veux et al. | |
| 7,431,404 B2 | 10/2008 | Senoo | |
| 7,445,034 B1 * | 11/2008 | Huang | 152/381.5 |
| 7,487,811 B2 * | 2/2009 | Schelhaas | 152/381.5 |
| 7,501,033 B2 | 3/2009 | Hrycyk et al. | |
| 2005/0189813 A1 | 9/2005 | Bauer | |
| 2005/0210676 A1 | 9/2005 | Chiu | |
| 2007/0029867 A1 | 2/2007 | Drage | |
| 2007/0175558 A1 | 8/2007 | Kidney | |

FOREIGN PATENT DOCUMENTS

| | | |
|---|---|---|
| EP | 561762 A1 | 9/1993 |
| JP | S63-16204 | 2/1988 |
| JP | 07112601 A | 5/1995 |
| JP | 07300003 A | 11/1995 |
| JP | 09002005 A | 1/1997 |
| JP | 11105501 A | 4/1999 |
| JP | 2008-105519 | 5/2008 |

* cited by examiner

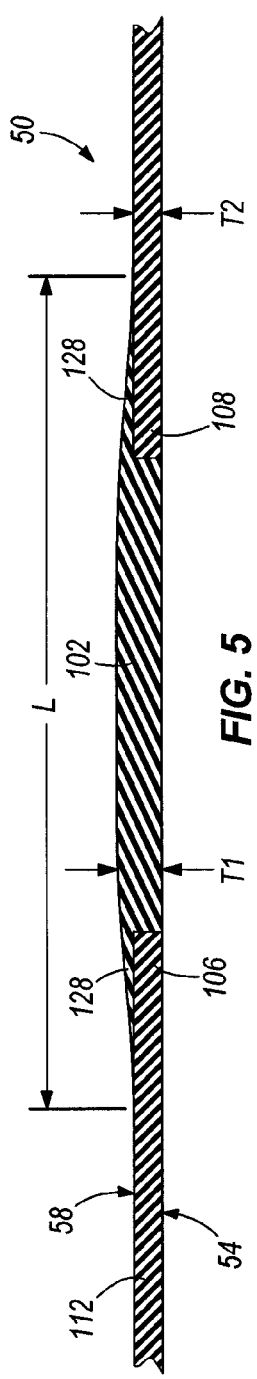
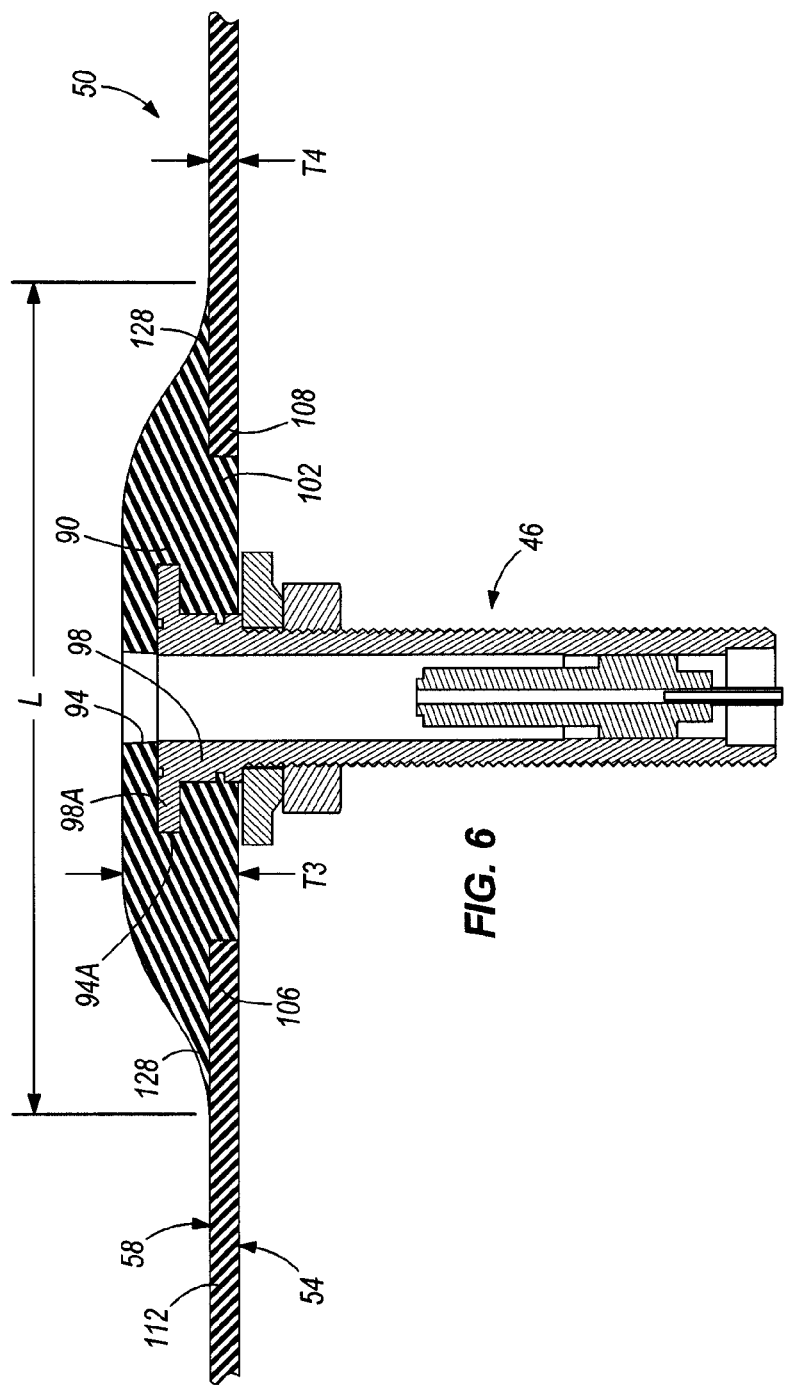

TUBELESS RIM SEAL FOR A LACED WHEEL

BACKGROUND

The present invention relates to sealing the rim portion of a wire spoke wheel (i.e., "laced" wheel) so that a tubeless pneumatic tire can be used with the laced wheel. The invention further relates to a manufacturing method for such a seal.

SUMMARY

In one embodiment, the invention provides a method of manufacturing a continuous circumferential rim seal having a contoured cross-sectional profile. A rim seal segment is provided having two free ends and being constructed of a sealing material having the contoured cross-sectional profile. The rim seal segment has a length shorter than a circumference of the rim seal. The two free ends are inserted into a mold in spaced relationship with each other, and a connector is molded between the two free ends to connect the free ends and transform the rim seal segment into a continuous circumferential rim seal.

In another embodiment, the invention provides a rim seal including a major segment having two circumferentially spaced apart ends. A cross-sectional thickness of the major segment is substantially constant in the circumferential direction. A minor segment couples the ends of the major segment to form a continuous circumferential loop. The minor segment includes a valve stem-accommodating portion having a thickness greater than the thickness of the major segment.

In yet another embodiment, the invention provides a laced wheel assembly for use with a tubeless tire. A laced wheel includes a hub portion, a rim portion having a plurality of spoke holes, and a plurality of spokes connecting the hub portion and the rim portion. A portion of each of the plurality of spokes is retained in a corresponding one of the spoke holes. A rim seal includes an inner surface configured to lie on the rim portion of the laced wheel, and an outer surface configured to face away from the rim portion of the laced wheel. The rim seal covers the plurality of spoke holes in the rim portion. A tire-facing surface is defined by the combination of the rim portion and the outer surface of the rim seal, and the tire-facing surface has a profile conforming to an industry standard.

Other aspects of the invention will become apparent by consideration of the detailed description and accompanying drawings.

BRIEF DESCRIPTION OF THE DRAWINGS

FIG. 5 is a cross-sectional view of a rim seal of the laced wheel assembly, taken along line 5-5 of FIG. 4.

FIG. 6 is a cross-sectional view of the rim seal of the laced wheel assembly, taken along line 6-6 of FIG. 4.

DETAILED DESCRIPTION

Figure 1:
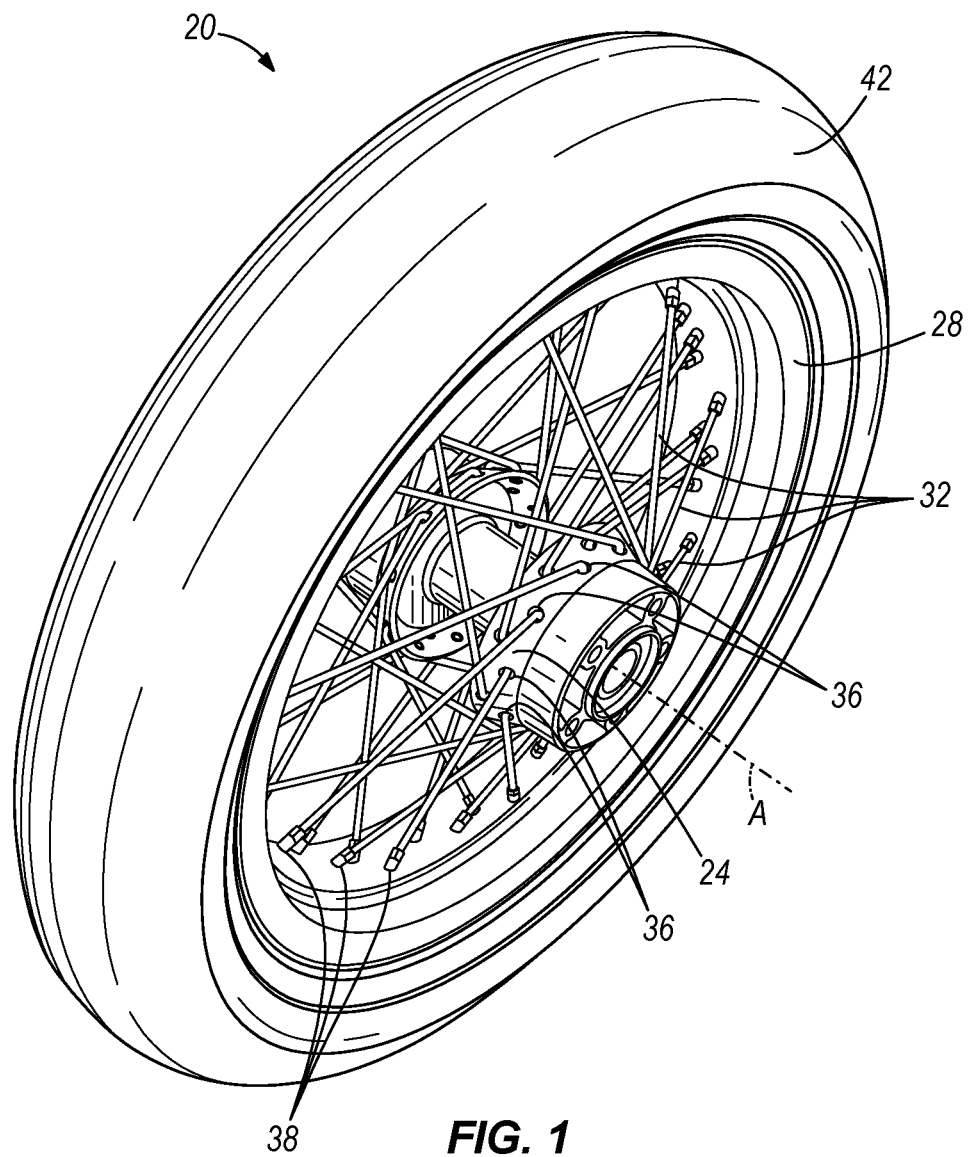
FIG. 1 is a perspective view of a laced wheel assembly.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

The laced wheel assembly 20 illustrated in FIGS. 1-4 includes a hub 24, a rim 28, and a plurality of spokes 32 connecting the hub 24 and the rim 28. The hub 24 and the rim 28 include respective pluralities of spoke holes 36, 38. One end of each spoke 32 is retained in one of the spoke holes 36 of the hub 24, while the opposite end is retained in a corresponding one of the spoke holes 38 of the rim 28. A tire 42 is coupled to the rim 28 for rotation therewith. The laced wheel assembly 20, and particularly the hub 24, defines an axis of rotation A. The laced wheel assembly 20 may be coupled to a fork or a swingarm of a motorcycle (not shown), or may be coupled to the chassis of virtually any type of wheeled vehicle, with a spindle or axle centered along the axis A. A central plane of rotation P (FIG. 3) extends through the center of the laced wheel assembly 20 perpendicular to the axis A.

Figure 2:
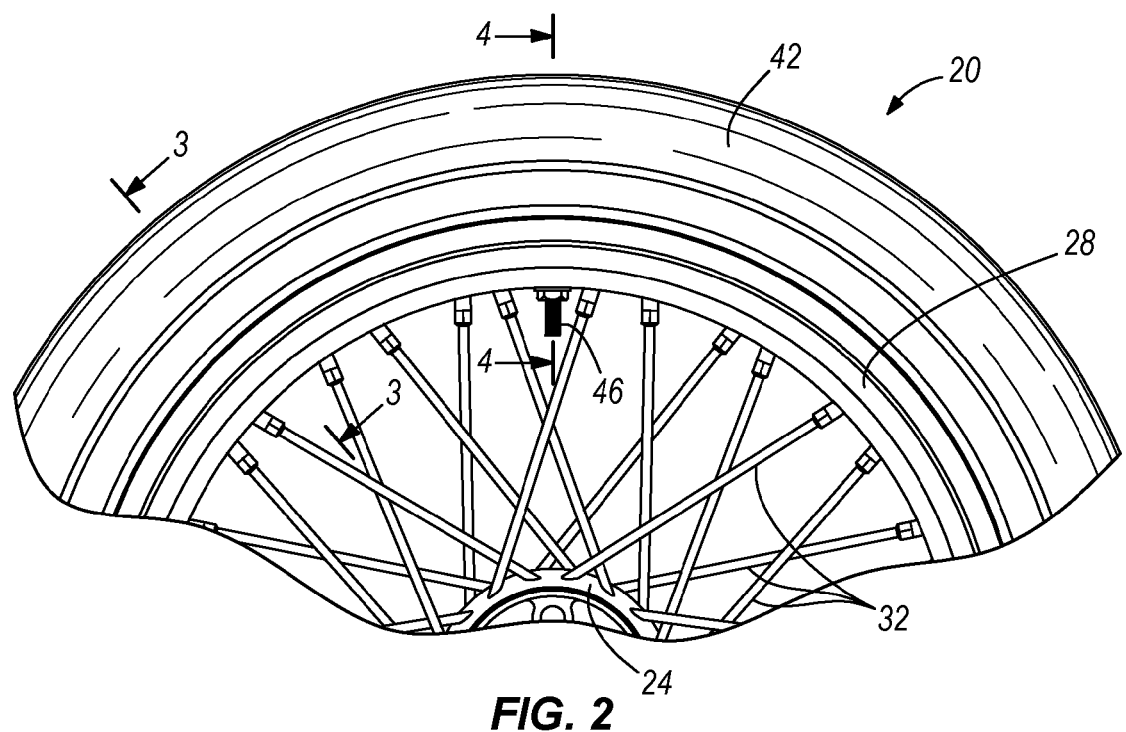
FIG. 2 is a side view of a portion of the laced wheel assembly of FIG. 1.

As shown in FIG. 2, the laced wheel assembly 20 includes a valve stem 46 for selectively controlling the admittance and release of compressed air into and out of the tire 42. As shown in the cross-sectional views of FIGS. 3 and 4, a rim seal 50 is positioned on the surface of the rim 28 generally between the rim 28 and the tire 42 to cover all of the spoke holes 38 in the rim 28. The rim seal 50 is constructed of an elastomeric material suitable for sealing all of the spoke holes 38 to prevent loss of air through the spoke holes 38 and inadvertent deflation of the tire 42. In one construction, the rim seal 50 is constructed of SANTOPRENE™ available from ExxonMobile Chemical. The rim seal 50 includes an inner surface 54 configured to lie against the rim 28, and an outer surface 58 configured to face generally away from the rim 28 and toward the tire 42.

Figure 3:
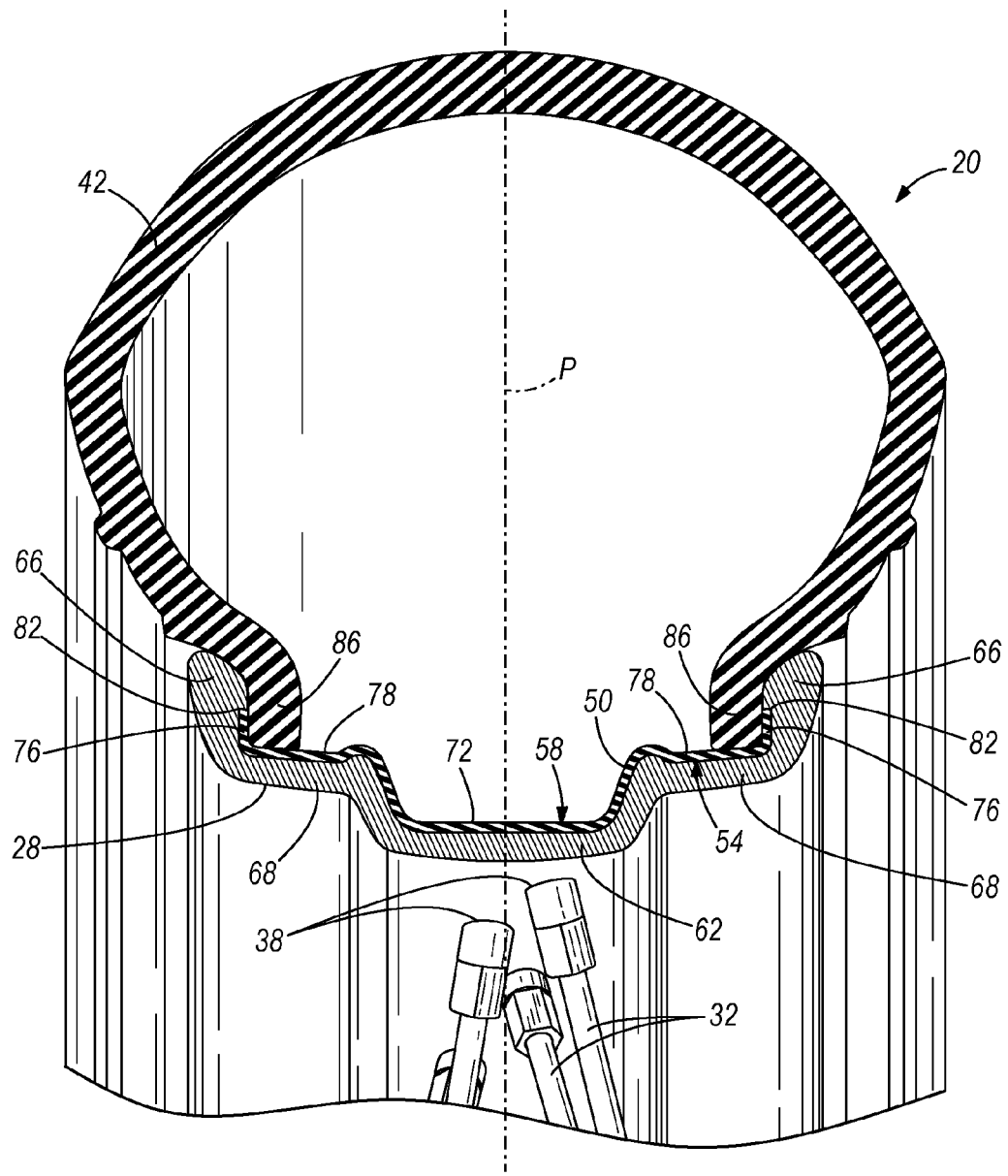
FIG. 3 is a cross-sectional view of the laced wheel assembly, taken along line 3-3 of FIG. 2.
Figure 4:
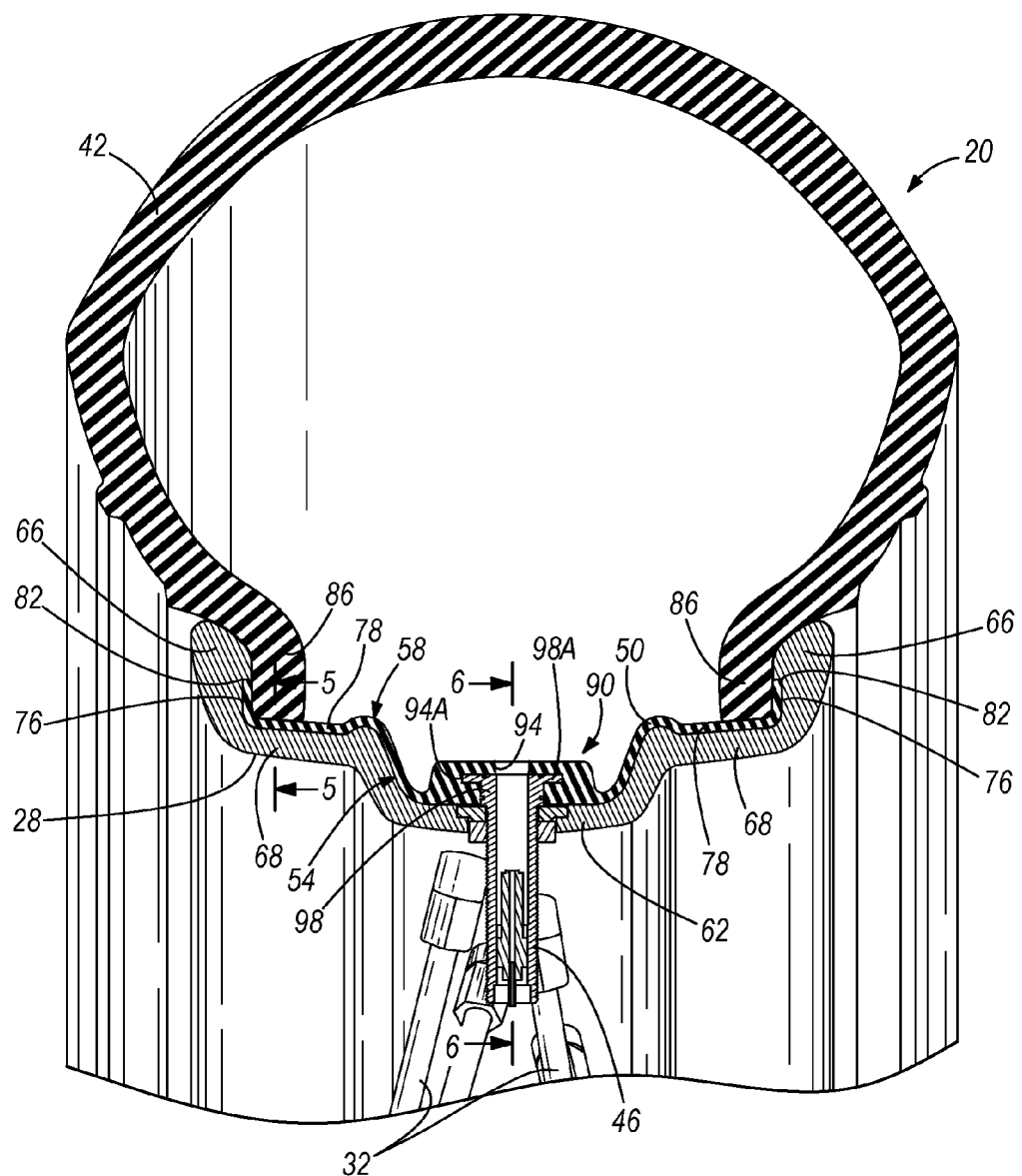
FIG. 4 is a cross-sectional view of the laced wheel assembly, taken along line 4-4 of FIG. 2, through a valve stem assembly.
Figure 7:
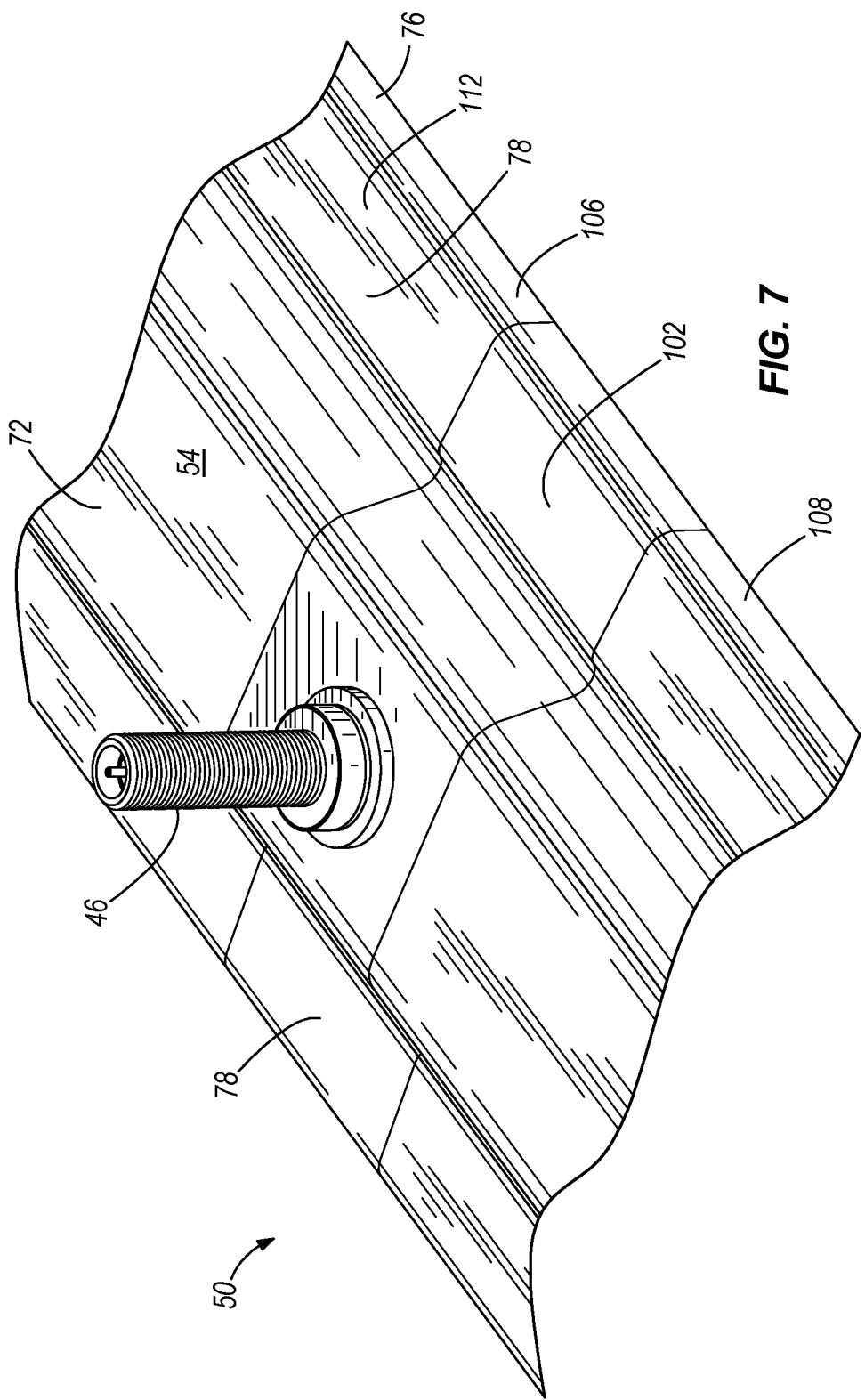
FIG. 7 is a perspective view of a valve stem portion of the rim seal, illustrating an outer side thereof.

As shown in FIGS. 3 and 4, the rim 28 includes a drop center portion 62 and a pair of upstanding flanges 66. The flanges 66 are positioned at the lateral edges of the rim 28 on opposing sides of the central plane P. An intermediate connecting portion 68 extends laterally between each of the flanges 66 and the drop center portion 62. Corresponding to the general shape of the rim portion 28, the rim seal 50 includes a drop center portion 72, a pair of upstanding flanges 76, and a laterally-extending intermediate connecting portion 78 extending between each of the flanges 76 and the drop center portion 72. A relief 82 is undercut in each of the flanges 66 of the rim 28 to at least partially receive the corresponding flanges 76 of the rim seal 50. As shown in FIGS. 3 and 4, each flange 76 is positioned substantially between one of the rim flanges 66 and one of a pair of tire beads 86 provided on the tire 42. When the tire 42 is inflated, the tire beads 86 are pressed laterally outwardly so that each of the rim seal flanges 76 is compressed between the adjacent tire bead 86 and rim flange 66. This not only inhibits or substantially prevents the compressed air within the tire 42 from leaking out between the tire beads 86 and the rim flanges 66, but also inhibits or substantially prevents the compressed air within the tire 42 from getting between the rim 28 and the rim seal 50 so that the compressed air does not escape through the spoke holes 38 in the rim 28.

Figure 8:
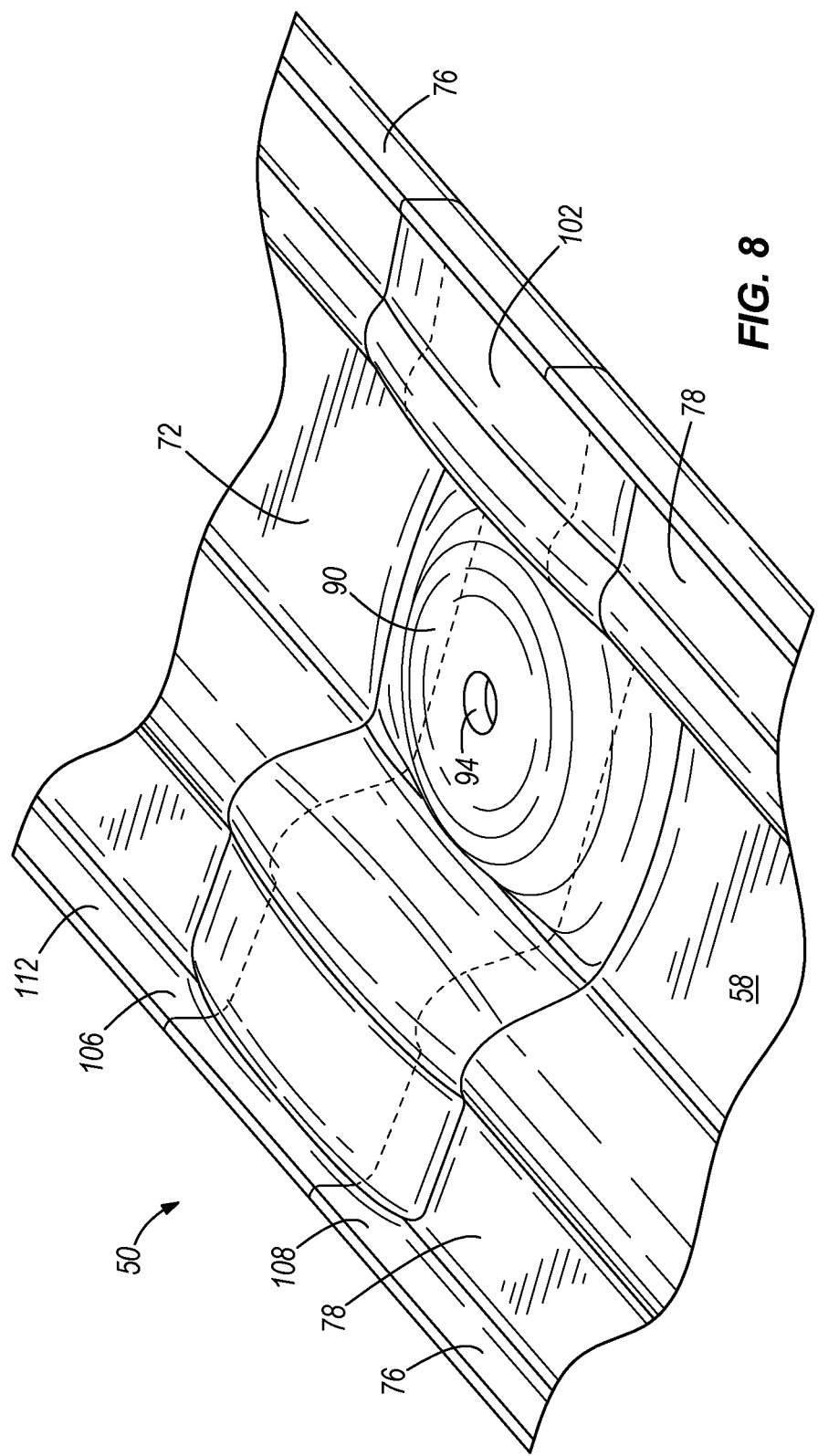
FIG. 8 is a perspective view of the valve stem portion of the rim seal, illustrating an inner side thereof.

As shown in FIGS. 4, 6, and 8, the rim seal 50 includes a valve stem-accommodating portion 90 having an aperture 94 for receiving a base 98 of the valve stem 46. The aperture 94 includes a groove 94A for receiving a base flange 98A of the valve stem 46. As described in further detail below, the valve stem-accommodating portion 90 may be molded to encase or encapsulate the base 98 of the valve stem 46, or the valve stem-accommodating portion 90 may be simply be formed with the aperture 94, in which the valve stem base 98 is later inserted.

Referring especially to FIGS. 5-8, the valve stem-accommodating portion 90 is molded as part of a minor segment 102 of the rim seal 50. FIGS. 5 and 6 are cross-sectional views taken by cutting the rim seal 50 at two locations parallel to the central plane P. Two ends 106, 108 of a major segment 112 of the rim seal 50 are coupled together with the minor segment 102 to make the rim seal 50 whole (i.e., to form a complete loop). The major segment 112 makes up at least 90 percent of the total circumference of the rim seal 50, and in some constructions, makes up about 95 percent or more of the total circumference of the rim seal 50.

Figure 9:
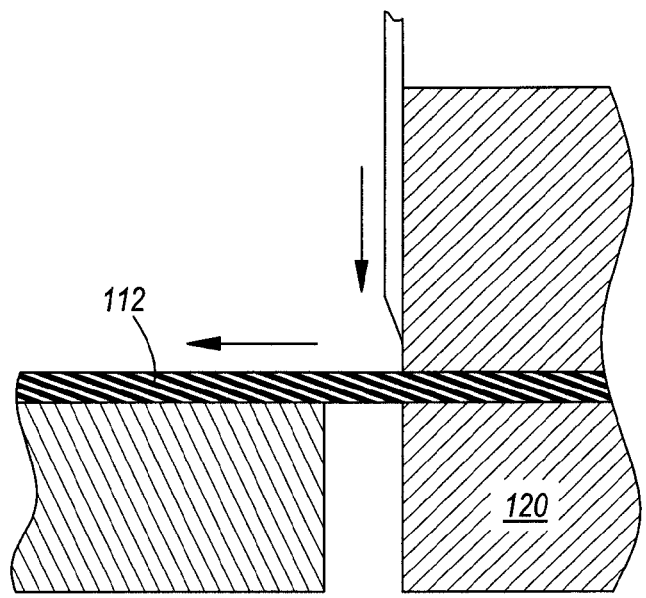
FIG. 9 is a schematic view of a cutting-to-length process carried out on an extrusion to form an extruded rim seal segment prior to forming into a circumferential rim seal.

The major segment 112 is an extruded segment that is extruded to have a cross-sectional profile substantially equivalent to the cross-sectional profile of the finished circumferential rim seal 50 (i.e., the major segment 112 is extruded to include the drop center portion 72, the upstanding flanges 76, and the intermediate connecting portions 78, all in substantially their final shape as shown in FIG. 3). This is shown schematically in FIG. 9. A raw extrusion is ejected from an extrusion die 120 and cut to form the major segment 112. The raw extrusion is cut to a length that is less than the final circumference of the rim seal 50. The desired cutting length of the raw extrusion is easily variable with the same tooling equipment so that rim seals of many different final diameters can be manufactured with very little set-up time and without additional equipment.

Figure 10:
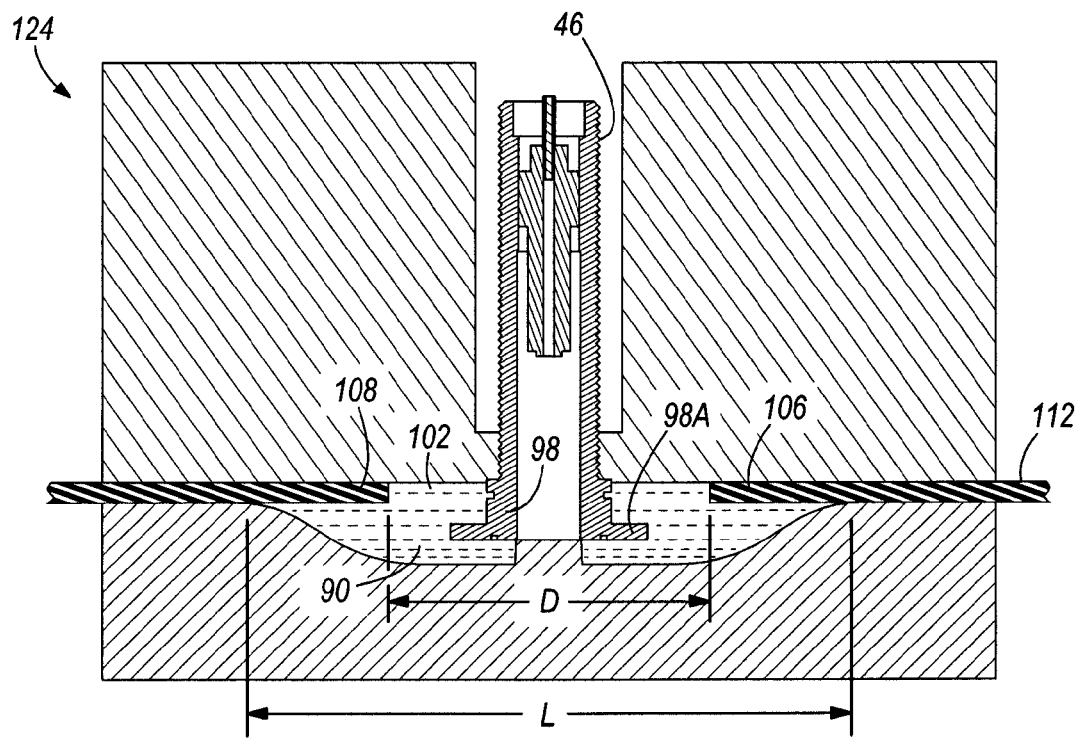
FIG. 10 is a schematic view of a molding process by which two free ends of the extruded rim seal segment are coupled together to define a circumferentially extending rim seal.

As schematically illustrated in FIG. 10, the two ends 106, 108 of the major segment 112 are inserted into a mold 124 and spaced a distance D away from each other. The minor segment 102 is molded as a connector segment to connect the ends 106, 108 and transform the major segment 112 into a loop, forming the circumferentially continuous rim seal 50. FIG. 10 also illustrates the valve stem 46 being held with its base 98 inside the mold 124 so that liquid injected into the mold 124 surrounds the base 98 as the minor segment 102 is molded into shape. Alternately, the mold 124 can be shaped to form the valve stem-receiving aperture 94, and the valve stem 46 can be inserted into the aperture 94 after the rim seal 50 is released from the mold 124.

As shown in FIGS. 5, 6, and 10, the overall length L of the minor segment 102, as measured in a circumferential direction of the rim seal 50, is greater than the distance D between the two ends 106, 108 of the major segment 112 such that overlapping portions 128 are molded onto the major segment 112. It should be noted that FIGS. 5 and 6 illustrate the rim seal 50 in a straightened configuration rather than the circular "in-use" configuration so that the overall length L and the distance D may be clearly illustrated as linear dimensions. In some constructions, the minor segment 102 extends past each of the ends 106, 108 by at least ¼ inch. In some constructions, the minor segment 102 extends past each of the two ends 106, 108 by about ½ inch.

The minor segment 102 tapers gradually across the overall length L, from a large cross-sectional thickness to the smaller cross-sectional thickness of the corresponding adjacent portions of the major segment 112. As used herein, "cross-sectional thickness" refers to the distance between the inner surface 54 and the outer surface 58 of the rim seal 50 at a given location. As shown in FIG. 5, the minor segment 102 has a maximum, nominal cross-sectional thickness T1 that is greater than a cross-sectional thickness T2 of the adjacent portions of the major segment 112. In some constructions, the cross-sectional thickness T2 of the major segment 112 is less than, but at least two-thirds as great as, the maximum, nominal cross-sectional thickness T1 of the minor segment 102. The cross-section of FIG. 5 is taken through one of the intermediate connecting portions 78, but is generally representative of the thickness relationship between the minor segment 102 and the major segment 112 at all locations except for the valve stem-accommodating portion 90.

As shown in FIG. 6, the valve stem-accommodating portion 90 of the minor segment 102 has a maximum, nominal cross-sectional thickness T3 that is greater than a cross-sectional thickness T4 of the drop center portion 72 of the rim seal 50 at each of the ends 106, 108 adjacent the minor segment 102. In some constructions, the cross-sectional thickness T4 of the drop center portion 72 of the rim seal is less than half, and as small as about one-fifth, the maximum, nominal cross-sectional thickness T3 of the valve stem-accommodating portion 90. In the illustrated construction, the cross-sectional thicknesses T2, T4 of the various parts of the major segment 112 are substantially equal since the major segment 112 is formed to have a substantially uniform cross-sectional thickness.

Figure 11:
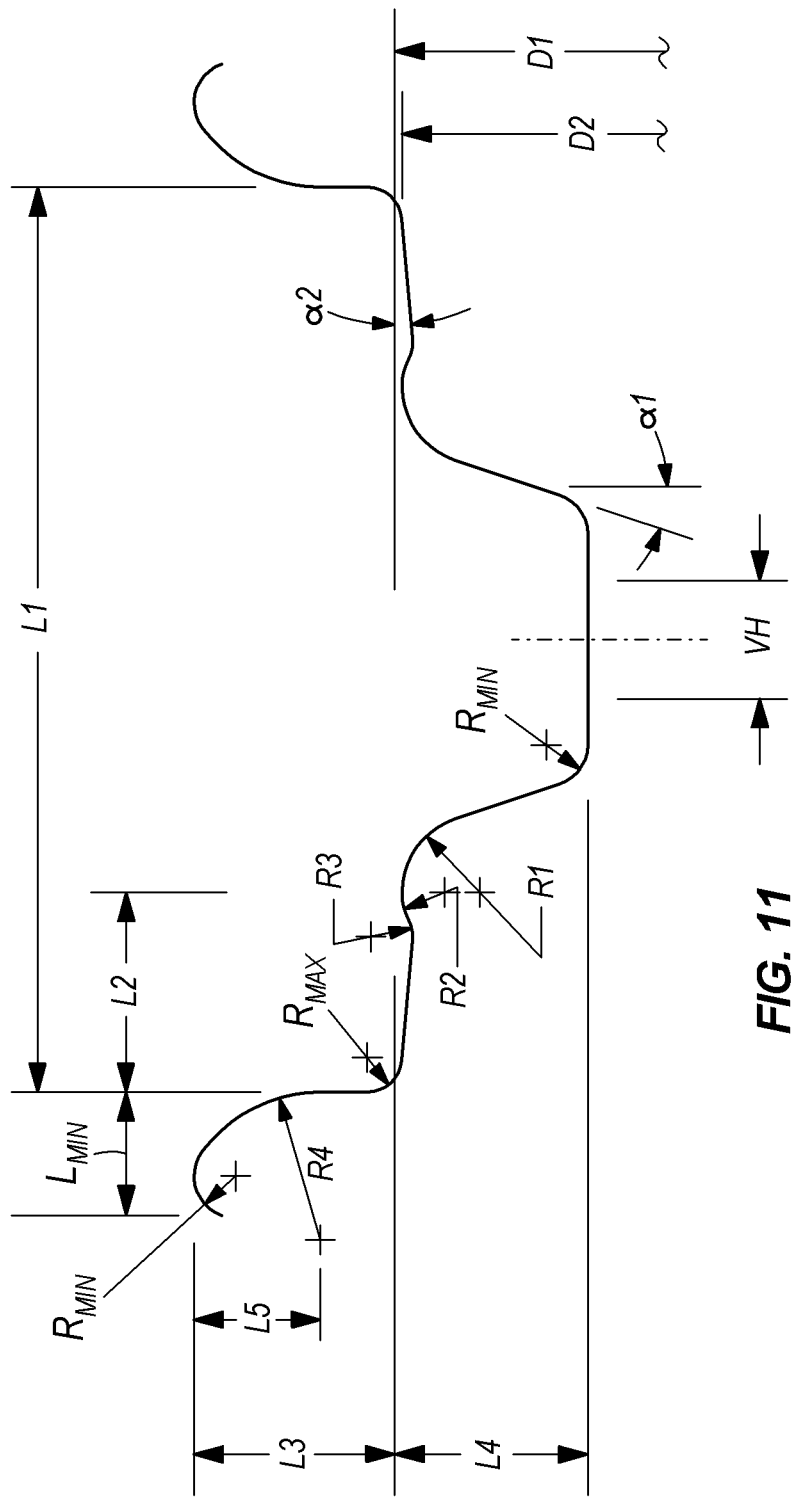
FIG. 11 is a dimensioned view of a standardized rim profile for a motorcycle wheel.

FIG. 11 illustrates a set of conforming guidelines for meeting an industry standard for the tire-facing surface or "outer" surface of the rim of a motorcycle wheel. The illustrated guidelines are for the "MT" profile standard, set by The Tire and Rim Associaion, Inc. The guidelines include several variables L1, L2, L3, L4, and R1. The MT profile standard sets forth the acceptable value for each of the variables L2, L3, L4, and R1 for a given nominal width L1. Additional variables, such as the diametrical measurements D1 and D2 are not necessarily fixed to a particular value by the guidelines. Rather, each different size of MT-conforming rim can be manufactured within the MT profile standard in any one of a plurality of diameters. Furthermore, the MT profile standard defines additional linear, radial, and angular dimensions L5, $L_{MIN}$, R2, R3, R4, $R_{MAX}$, $R_{MIN}$, $\alpha 1$, and $\alpha 2$, which are either given fixed numeric values (with an allowable tolerance) or called out as maximum or minimum allowable values. These dimensions do not vary with different diameters D1, D2 or widths L1. The valve hole diameter VH is determined based on the desired type of valve stem. Although the illustrated guidelines are for the MT profile standard set by The Tire and Rim Associaion, Inc., the tire-facing surface may be manufactured according to the guidelines for other profile standards, such as the "MT" profile standard, set by The European Tyre and Rim Technical Organisation (ETRTO), among others.

As mentioned above, a relief 82 is undercut in each of the flanges 66 of the rim 28 so that the flanges 76 of the rim seal 50 can be seated therein. With the rim seal 50 and the tire 42 in place as shown in FIGS. 1-4, the outer surface 58 of the rim seal 50 and the adjacent part of the rim 28 (at the flanges 66) combine to define a tire-facing profile that conforms to an industry standard, such as the MT standard of The Tire and Rim Association, Inc. The rim 28 without the rim seal 50 in place does not necessarily conform to the industry standard. The flanges 76 of the rim seal 50 are configured to define a smooth transition (i.e., substantially "flush") with the rim 28 adjacent each relief 82 and to conform to the industry standard when compressed by the beads 86 of the inflated tire 42. The rim seal 50 and the rim 28 do not necessarily conform to the industry standard when the tire 42 is not installed or is installed but not inflated. As used herein, "inflated" refers to suitable inflation for vehicle operation, at a manufacturer's recommended air pressure or within an acceptable tolerance range thereof.

Various features and advantages of the invention are set forth in the following claims.

What is claimed is:

1. A method of manufacturing a continuous circumferential rim seal having a contoured cross-sectional profile, the method comprising:
   providing a rim seal segment having two free ends and being constructed of a sealing material having the contoured cross-sectional profile, the rim seal segment having a length shorter than a circumference of the rim seal;
   inserting the two free ends into a mold in spaced relationship with each other to define a void therebetween;
   placing a valve stem into the mold; and
   injecting liquid into the mold to fill the void between the two free ends, thereby molding a connector between the two free ends to connect the free ends and transform the rim seal segment into a continuous circumferential rim seal and molding at least a portion of the valve stem into the connector.

2. The method of claim 1, wherein the connector extends circumferentially greater than the distance between the two free ends.

3. The method of claim 1, further comprising molding the connector to have a cross-sectional thickness at any given portion that is greater than a cross-sectional thickness of the rim seal segment.

4. The method of claim 3, wherein the connector has a nominal cross-sectional thickness and an enlarged cross-sectional thickness corresponding to a valve stem-accommodating portion, and wherein the cross-sectional thickness of the rim seal segment is at least about two-thirds the nominal cross-sectional thickness of the connector and at least about one-fifth the enlarged cross-sectional thickness of the connector.

5. The method of claim 1, further comprising forming the rim seal segment by extruding a sealing material to have the contoured cross-sectional profile; and cutting the extrusion to the length of the rim seal segment.

6. A rim seal comprising:
   a major segment having two circumferentially spaced apart ends, a cross-sectional thickness of the major segment being substantially constant in the circumferential direction;
   a minor segment coupling the ends of the major segment to form a continuous circumferential loop;
   a valve stem-accommodating portion in the minor segment, the valve stem-accommodating portion having a thickness greater than the thickness of the major segment; and
   a valve stem molded into the minor segment.

7. The rim seal of claim 6, wherein the major segment has a cross-sectional profile including a drop center portion, two axially extending intermediate portions, and two flange portions.

8. The rim seal of claim 6, wherein any given portion of the minor segment has a cross-sectional thickness greater than a cross-sectional thickness of the major segment.

9. The rim seal of claim 8, wherein the cross-sectional thickness of the major segment is at least two-thirds the cross-sectional thickness of any given portion of the minor segment besides the valve stem-accommodating portion.

10. The rim seal of claim 6, wherein the minor segment extends circumferentially greater than a circumferential distance between the two ends of the major segment.

11. The rim seal of claim 10, wherein the minor segment extends past each of the two ends by at least ¼ inch.

12. The rim seal of claim 11, wherein the minor segment extends past each of the two ends about ½ inch.

13. The rim seal of claim 6, wherein the major segment is extruded to have a cross-sectional profile substantially equivalent to a cross-sectional profile of the finished circumferential rim seal.

14. The rim seal of claim 6, wherein the minor segment directly encases a base of the valve stem to secure the valve stem in the valve stem-accommodating portion.

15. A method of manufacturing a continuous circumferential rim seal having a contoured cross-sectional profile, the method comprising:
   providing a rim seal segment having two free ends and being constructed of a sealing material having the contoured cross-sectional profile, the rim seal segment having a length shorter than a circumference of the rim seal;
   inserting the two free ends into a mold in spaced relationship with each other to define a void therebetween; and
   injecting liquid into the mold to fill the void between the two free ends, thereby molding a connector between the two free ends to connect the free ends and transform the rim seal segment into a continuous circumferential rim seal, the connector being molded to have a cross-sectional thickness at any given portion that is greater than a cross-sectional thickness of the rim seal segment.

16. The method of claim 15, wherein the connector extends circumferentially greater than the distance between the two free ends.

17. The method of claim 15, wherein the connector is molded to include a valve stem aperture.

18. The method of claim 15, wherein the connector has a nominal cross-sectional thickness and an enlarged cross-sectional thickness corresponding to a valve stem-accommodating portion, and wherein the cross-sectional thickness of the rim seal segment is at least about two-thirds the nominal cross-sectional thickness of the connector and at least about one-fifth the enlarged cross-sectional thickness of the connector.

19. The method of claim 15, further comprising forming the rim seal segment by extruding a sealing material to have the contoured cross-sectional profile; and cutting the extrusion to the length of the rim seal segment.

* * * * *